US010560536B2

(12) United States Patent
Joshi et al.

(10) Patent No.: US 10,560,536 B2
(45) Date of Patent: Feb. 11, 2020

(54) SIMPLIFYING USER INTERACTIONS WITH DECISION TREE DIALOG MANAGERS

(71) Applicant: INTERNATIONAL BUSINESS MACHINES CORPORATION, Armonk, NY (US)

(72) Inventors: Sachindra Joshi, Gurgaon (IN); Harshit Kumar, Delhi (IN); David Nahamoo, Great Neck, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 15/245,276

(22) Filed: Aug. 24, 2016

(65) Prior Publication Data
US 2018/0062931 A1    Mar. 1, 2018

(51) Int. Cl.
*H04L 29/08* (2006.01)
(52) U.S. Cl.
CPC .................................. *H04L 67/16* (2013.01)
(58) Field of Classification Search
CPC ......... H04L 41/12; H04L 41/22; H04L 12/44; H04L 67/12
See application file for complete search history.

(56) References Cited

U.S. PATENT DOCUMENTS

| | | | | |
|---|---|---|---|---|
| 6,727,914 | B1* | 4/2004 | Gutta | H04N 7/163 348/E7.061 |
| 7,139,697 | B2* | 11/2006 | Hakkinen | G06F 17/2715 704/9 |
| 9,424,745 | B1* | 8/2016 | Kagoshima | G08G 1/0125 |
| 9,616,828 | B2* | 4/2017 | Ben Noon | B60R 16/023 |
| 9,838,410 | B2* | 12/2017 | Muddu | H04L 63/1425 |
| 2005/0165607 | A1 | 7/2005 | Di Fabbrizio et al. | |
| 2007/0094060 | A1* | 4/2007 | Apps | G06Q 10/00 705/7.36 |
| 2007/0208497 | A1* | 9/2007 | Downs | G08G 1/0104 701/117 |
| 2008/0071465 | A1* | 3/2008 | Chapman | G01C 21/3691 701/117 |
| 2009/0094618 | A1* | 4/2009 | Huntsman | H04L 63/1408 719/318 |

(Continued)

OTHER PUBLICATIONS

Fodor, "Dialog Management for Decision Processes", Proceedings of the 3rd Language and Technology Conference: Human Language Technologies as a Challenge for Computer Science and Linguistics, 2007, pp. 1-4.

(Continued)

*Primary Examiner* — Davoud A Zand
(74) *Attorney, Agent, or Firm* — L. Jeffrey Kelly

(57) ABSTRACT

A method for simplifying user interactions with decision tree dialog managers is provided. The method may include receiving from a client computer, by a server computer, a user input. The server computer may identify one or more candidate nodes of a decision tree corresponding to the received user input. An entropy value may be calculated by the server computer for each of the identified candidate nodes. The server computer may then select a current node from among the candidate nodes, whereby the selected current node has a lowest calculated entropy value. A prompt associated with the selected current node may be transmitted to the user by the server computer.

10 Claims, 6 Drawing Sheets

(56) References Cited

U.S. PATENT DOCUMENTS

| | | | | |
|---|---|---|---|---|
| 2009/0281981 | A1* | 11/2009 | Chen | G06N 20/00 |
| | | | | 706/56 |
| 2012/0254333 | A1* | 10/2012 | Chandramouli | G06F 17/27 |
| | | | | 709/206 |
| 2014/0122381 | A1* | 5/2014 | Nowozin | G06N 20/00 |
| | | | | 706/12 |
| 2015/0049634 | A1* | 2/2015 | Levchuk | H04L 41/14 |
| | | | | 370/254 |
| 2015/0127631 | A1 | 5/2015 | Anand et al. | |
| 2016/0275288 | A1* | 9/2016 | Sethumadhavan | G06F 21/566 |
| 2016/0335260 | A1* | 11/2016 | Convertino | G06F 17/3053 |
| 2018/0005126 | A1* | 1/2018 | Yamagami | G06N 5/045 |

OTHER PUBLICATIONS

Mell et al., "The NIST Definition of Cloud Computing", National Institute of Standards and Technology, Recommendations of the National Institute of Standards and Technology, Special Publication 800-145, Sep. 2011, 7 pages.

* cited by examiner

SIMPLIFYING USER INTERACTIONS WITH DECISION TREE DIALOG MANAGERS

BACKGROUND

The present invention relates generally to the field of computers, and more particularly to decision trees.

A decision tree is a flowchart-like decision support tool that uses a tree graph to determine possible choices, and may have one or more nodes associated with it. The nodes are structures that contain values or conditions, and each node of the tree may have a parent and children associated with it. As such, each node may be described as a root, branch, or leaf of the tree based on the associated parent and child nodes. While a root node is a node that has no associated parent node and a leaf node is a node that has no associated child nodes, a branch node is a node that has both parent and child nodes. Decision trees take the form of a directed acyclic graph, whereby the tree is traversed from the root node to a leaf node via one or more branch nodes. Therefore, a decision tree requires input from a user at every branch node to determine the appropriate next node. Decision trees are utilized in fields such as technical support, finance, medicine and healthcare, and education.

SUMMARY

According to one embodiment, a method for simplifying user interactions with decision tree dialog managers is provided. The method may include receiving from a client computer, by a server computer, a user input. The server computer may identify one or more candidate nodes of a decision tree corresponding to the received user input. An entropy value may be calculated by the server computer for each of the identified candidate nodes. The server computer may then select a current node from among the candidate nodes, whereby the selected current node has a lowest calculated entropy value. A prompt associated with the selected current node may be transmitted to the user by the server computer.

According to another embodiment, a computer system for simplifying user interactions with decision tree dialog managers is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving from a client computer, by a server computer, a user input. The server computer may identify one or more candidate nodes of a decision tree corresponding to the received user input. An entropy value may be calculated by the server computer for each of the identified candidate nodes. The server computer may then select a current node from among the candidate nodes, whereby the selected current node has a lowest calculated entropy value. A prompt associated with the selected current node may be transmitted to the user by the server computer.

According to yet another embodiment, a computer program product for simplifying user interactions with decision tree dialog managers is provided. The computer program product may include one or more computer-readable storage devices and program instructions stored on at least one of the one or more tangible storage devices, the program instructions executable by a processor. The program instructions are executable by a processor for performing a method that may accordingly include receiving from a client computer, by a server computer, a user input. The server computer may identify one or more candidate nodes of a decision tree corresponding to the received user input. An entropy value may be calculated by the server computer for each of the identified candidate nodes. The server computer may then select a current node from among the candidate nodes, whereby the selected current node has a lowest calculated entropy value. A prompt associated with the selected current node may be transmitted to the user by the server computer.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
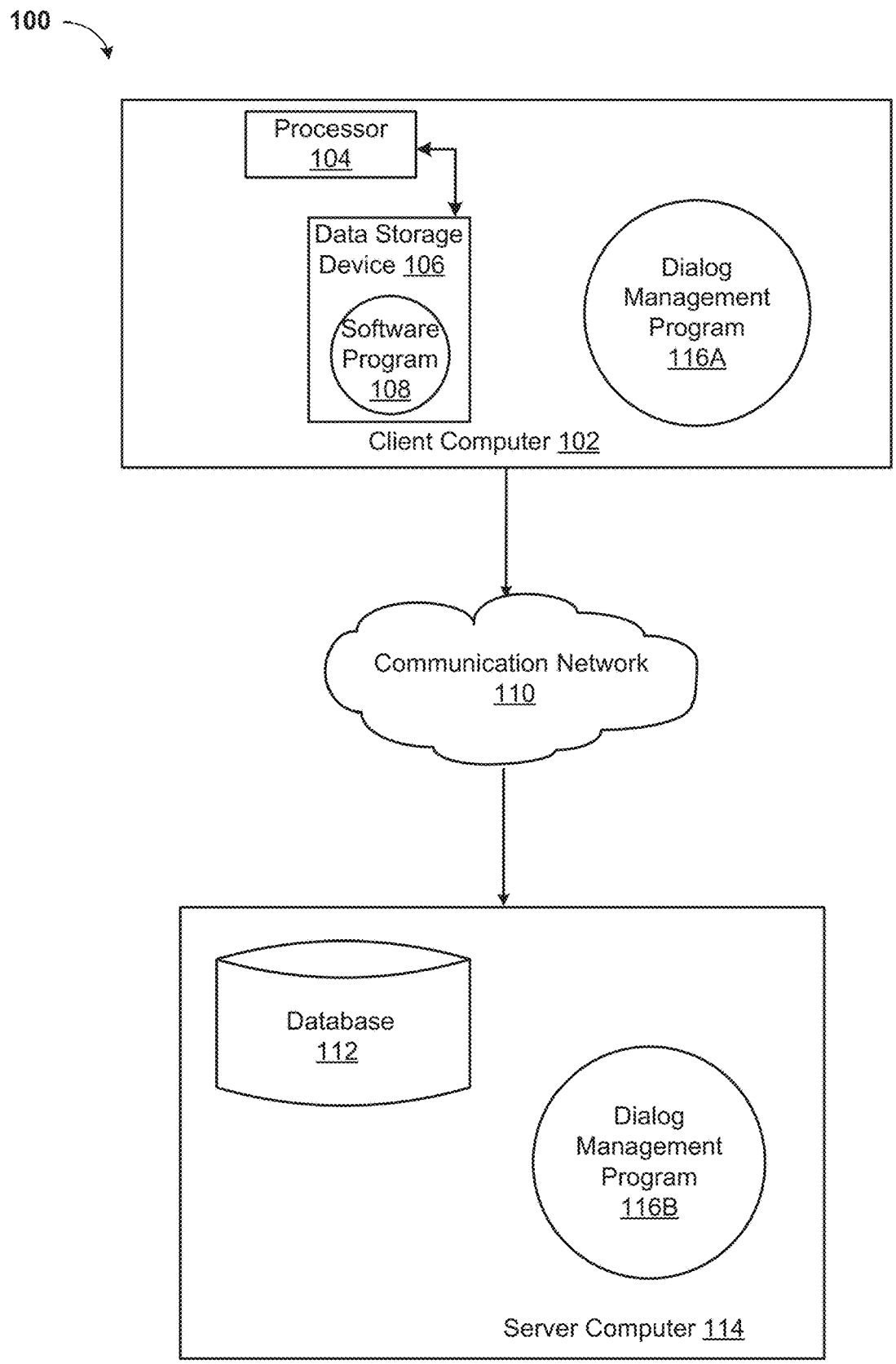
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to decision trees. The following described exemplary embodiments provide a system, method and program product to, among other things, simplify user interactions with a decision tree dialog manager. The present embodiment has the capacity to improve the technical field of decision trees by utilizing natural language processing to determine the appropriate response to a user input. More specifically, the present embodiment may determine a plurality of possible responses from leaf nodes on different branches of the decision tree. As such, the present embodiment may predict which response to the user input may be the most appropriate. Therefore, the present embodiment may simplify user input by not requiring a fixed traversal of the decision tree.

Furthermore, without such a concept as described herein, existing decision tree dialog managers typically must prompt the user at every branch node, thus increasing the amount of time and effort a user must expend to obtain an answer to their question. Therefore, continuing using existing decision tree management solutions cannot fully utilize the performance advantages gained through systems capable of natural-language processing.

As previously described, a decision tree is a flowchart-like decision support tool that uses a tree graph to determine possible choices, and may have one or more nodes associated with it. Decision trees take the form of a directed acyclic graph, whereby the tree is traversed from the root node to a leaf node via branch nodes. However, a decision tree currently requires input from a user at every branch node to determine the appropriate next node. Accordingly, it may be advantageous, among other things, to not require user input at every branch node and to not follow a fixed traversal path through the decision tree.

According to at least one implementation, the present embodiment may identify one or more nodes that may provide an answer to a question input by a user. As such, the present embodiment may determine the node that provides the best response to the user input. Furthermore, the user may be enabled to input additional information to allow the system to select the best response. One advantage of the present embodiment is that a user need not respond to more prompts by the system than may be necessary. Although the present embodiment may be useful with respect to technical support, it may further apply to other dialog-based fields. For example, the present embodiment may be utilized with respect to healthcare, education, and finance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following described exemplary embodiments provide a system, method and program product that simplifies user interaction with decision tree dialog managers. According to the present embodiment, the user interactions may be simplified by traversing the decision tree in such a way that one or more branch nodes may be avoided.

Referring to FIG. 1, an exemplary networked computer environment 100 in accordance with one embodiment is depicted. The networked computer environment 100 may include a client computer 102 with a processor 104 and a data storage device 106 that is enabled to run a Software Program 108 and a Dialog Management Program 116A. The networked computer environment 100 may also include a server computer 114 that is enabled to run a Dialog Management Program 116B that may interact with a database 112. The client computer 102 may communicate with the server computer 104 via a communications network 110. The networked computer environment 100 may include a plurality of client computers 102 and server computers 114, only one of each is shown. The communication network 110 may include various types of communication networks, such as a wide area network (WAN), local area network (LAN), a telecommunication network, a wireless network, a public switched network and/or a satellite network.

It should be appreciated that FIG. 1 provides only an illustration of one implementation and does not imply any limitations with regard to the environments in which different embodiments may be implemented. Many modifications to the depicted environments may be made based on design and implementation requirements. For example, it may be appreciated that the Dialog Management Program 116B is substantially the same or similar to the Dialog Management Program 116A. By way of example and not of limitation, the exemplary embodiments disclosed herein will be described with respect to the Dialog Management Program 116B on the server computer 114. However, any description of the Dialog Management Program 116B on the server computer 114 may also apply to the Dialog Management Program 116A on the client computer 102. In one embodiment, the client computer 102 may operate as an input device including a user interface while the Dialog Management Program 116B may run primarily on the server computer 114. In an alternative embodiment, the Dialog Management Program 116A may run primarily on the client computer 102 while the server computer 114 may be used for processing and storage of data used by the Dialog Management Program 116A.

The client computer 102 may communicate with the Dialog Management Program 116B running on the server computer 114 via the communications network 110. The communications network 110 may include connections, such as wire, wireless communication links, or fiber optic cables. As will be discussed with reference to FIG. 4, the server computer 114 may include internal components 800A and external components 900A, respectively, and the client computer 102 may include internal components 800B and external components 900B, respectively. The server computer 114 may also operate in a cloud computing service model, such as Software as a Service (SaaS), Platform as a Service (PaaS), or Infrastructure as a Service (IaaS). The server computer 114 may also be located in a cloud computing deployment model, such as a private cloud, community cloud, public cloud, or hybrid cloud. The client computer 102 may be, for example, a mobile device, a telephone, a personal digital assistant, a netbook, a laptop computer, a tablet computer, a desktop computer, or any type of computing devices capable of running a program, accessing a network, and accessing the database 112. According to various implementations of the present embodiment, the database 112 may additionally be embedded in various storage devices, such as, but not limited to a computer/mobile device, a networked server, or a cloud storage service.

As previously described, the client computer 102 may access the Dialog Management Program 116B, running on the server computer 114 via the communications network 110. For example, a user using the client computer 102 may utilize the Dialog Management Program 116B to simplify user interactions with decision tree dialog managers. The Dialog Management Program method is explained in more detail below with respect to FIG. 2.

Figure 2:
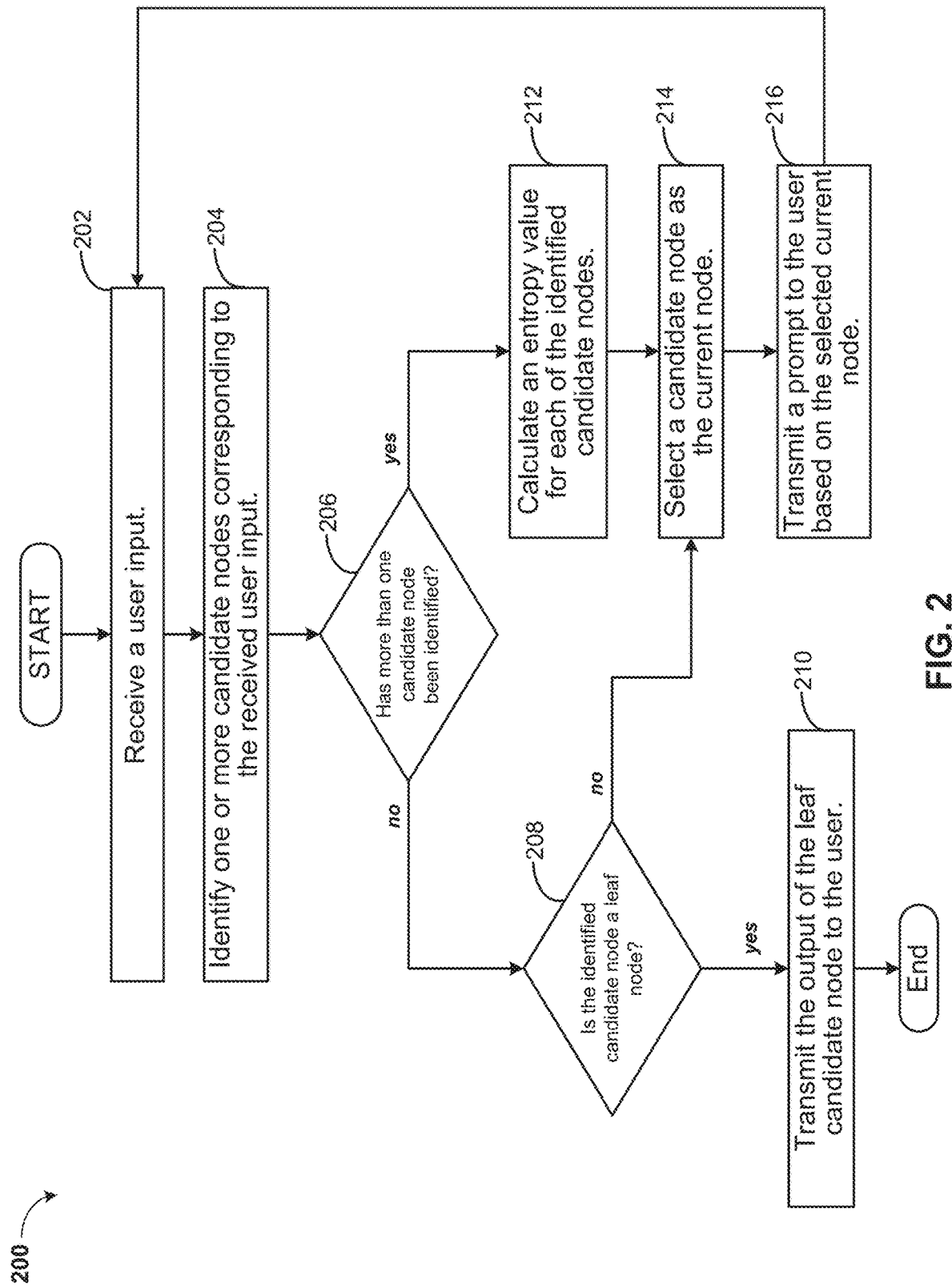
FIG. 2 is an operational flowchart illustrating the steps carried out by a program that simplifies user interactions with decision tree dialog managers, according to at least one embodiment.

Referring to FIG. 2, an operational flowchart 200 illustrating the steps carried out by a program, for example the Dialog Management Program 116B, that simplifies user interactions with dialog tree managers in accordance with one embodiment is depicted. FIG. 2 may be described with the aid of the exemplary embodiment of FIG. 1. As previously described, the Dialog Management Program 116B (FIG. 1) may simplify user interactions with a decision tree dialog manager by not requiring a user to follow a fixed path of traversal through the dialog tree.

At 202, a user input is received by a server computer. The user input may be related to any of a number of fields, such as technical support, medicine, education, finance, etc. The received user input may be in the form of natural language, which may accordingly include a sentence, question, phrase, or any fragment thereof. In operation, a user may type an input into the software program 108 (FIG. 1) on the client computer 102 (FIG. 1). The Dialog Management Program 116B (FIG. 1) may subsequently receive the user input from the software program 108 (FIG. 1) on the client computer 102 (FIG. 1) via the communication network 110 (FIG. 1). Dialog Management Program 116B (FIG. 1) may then perform natural language processing on the received user input in order to assist the user.

At 204, one or more candidate nodes corresponding to the received user input are identified by Dialog Management Program 116B (FIG. 1). A candidate node may be one of a plurality of nodes of a given decision tree that, considered by the server computer 114 (FIG. 1), is most closely associated with the received user input. Furthermore, because the decision tree may have any of a number of nodes, there may be more than one node that matches the received user input. It may be appreciated that the nodes may contain any of a plurality of data. For example, a leaf node may contain a pointer to a given response to a user input associated with a single concept. Alternatively, a branch node may contain a pointer to a list containing one or more child nodes of the given branch node. In the case of technical support, the user may input a phrase containing the word "Microsoft Windows". Accordingly, the Dialog Management Program 116B (FIG. 1) may identify the node or nodes from the given decision tree which are associated with or match the user's input. The nodes identified by the Dialog Management Program 116B (FIG. 1) may be associated with various Windows operating systems as candidate nodes, such as "Windows XP" and "Windows 7" and may contain a pointer to a predetermined solution to a problem for a program running on each of the operating systems. In operation, the decision tree may be stored in the database 112 (FIG. 1). The Dialog Management Program 116B (FIG. 1) may compare the received user input to various nodes of the stored decision tree in order to determine one or more candidate nodes that may be associated with or most closely match the received user input. The Dialog Management Program 116B may then store the candidate nodes in the database 112 (FIG. 1) in any form. Because the decision tree may have any of a number of nodes, there may be more than one node that matches the received user input.

At 206, the Dialog Management Program 116B (FIG. 1) determines whether one candidate node or more than one candidate nodes have been identified. If one candidate node has been identified by the Dialog Management Program 116B (FIG. 1), then the output of the candidate node may be transmitted to the user, as will be discussed below in 208, because it may be the only identified node that corresponds to the received user input. If, however, more than one candidate node has been identified by the Dialog Management Program 116B, then the Dialog Management Program 116B (FIG. 1), may determine which node may apply to the user. For example, for the received "Microsoft Windows" input, there may be a Windows XP node and a Windows 7 node stored in the database 112 (FIG. 1). Accordingly, because only one node may apply to the user may correspond to the received "Microsoft Windows" input. For example, Dialog Management Program 116B (FIG. 1) may determine that there may be two nodes from among the decision tree stored in the database 112 (FIG. 1) that may correspond to the received user input.

If at 206, the Dialog Management Program 116B determined that there is only one candidate node, the Dialog Management Program 116B then determines, at 208, whether that candidate node is a leaf node. If the candidate node is a leaf node, then the Dialog Management Program 116B may select the candidate node as a response to the received user input. Conversely, if the candidate node is a branch node and not a leaf node, then multiple leaf nodes may extend from that particular candidate node, such that a further determination may be required to find a relevant leaf node, as is described in detail below. In operation, if the Dialog Management Program 116B (FIG. 1) determines that there is only one candidate node from among the database 112 (FIG. 1) that corresponds to the received user input and that the candidate node is a leaf node, the Dialog Management Program 116B (FIG. 1) may transmit the output of the singular candidate node to the user over the communications network 110 (FIG. 1). For example, the Dialog Management Program 116B (FIG. 1) may determine that the received user input may contain the phrase "Windows 7" and that only one node from the decision tree stored within the database 112 (FIG. 1) corresponds to Windows 7. Thus, the Windows 7 node may be identified as the single candidate leaf node. Alternatively, if the received user input contains the phrase "Windows 8," the Dialog Management Program 116B (FIG. 1) may identify a node for Windows 8 stored in the database 112 (FIG. 1) as a single candidate node. The Dialog Management Program 116B (FIG. 1) may then determine that the node for Windows 8 has one or more child nodes in the database 112 (FIG. 1), such as nodes that may correspond to Windows 8.0 and Windows 8.1. Accordingly, the Dialog Management Program 116B may determine that the Windows 8 node is not a leaf node and that a further determination of the appropriate child node may be made.

If at 208 the Dialog Management Program 116B determines that the single candidate node is a leaf node, then it will transmit, at 210, the output of the candidate node to the user. The output associated with the candidate node may be, among other things, a response to the received user input as stored in the database 112 at the location of the memory address of the candidate node. In operation, the Dialog Management Program 116B (FIG. 1) may transmit, via the communication network 110 (FIG. 1), a response to the received user input that may be capable of being viewed by the user through software program 108 (FIG. 1). For example, as discussed above, the received user input may contain the phrase "Windows 7" that corresponds to a single candidate leaf node stored within the database 112 (FIG. 1). Thus, the Dialog Management Program 116B (FIG. 1) may transmit the output of the node corresponding to Windows 7 over the communication network 110 (FIG. 1) to the software program 108 (FIG. 1) to be viewed by the user.

If at 206 the Dialog Management Program 116B determined that more than one candidate node was identified, then the Dialog Management Program 116B calculates, at 212, an entropy value for each of the identified candidate nodes. The entropy calculation may be based on, for example, a redistribution of the probabilities for each of the identified candidate nodes. The probability distribution of the candidate nodes may be calculated and used to determine an entropy value for each of the candidate nodes. For example, the probability of each candidate node may be its popularity relative to all nodes of the decision tree. Alternatively, the probability distribution for the candidate nodes may be calculated based on operating system compatibility, market share, and version compatibility. In operation, the Dialog Management Program 116B (FIG. 1) may calculate an entropy value for each of the candidate nodes from the decision tree stored in the database 112 (FIG. 1) and may determine, among other things, a candidate node having the lowest entropy value. For example, the Dialog Management Program 116B (FIG. 1) may be pre-loaded with probability data that Windows 7 has a ninety percent market share and Windows XP has a ten percent market share. Thus, the Dialog Management Program 116B (FIG. 1) may calculate a lower entropy value for Windows 7 based on the higher probability that Windows 7 may be the user's operating system. Alternatively, for probability values calculated based on version compatibility, a program may be compatible with Windows 7 and incompatible with any other versions of Windows. Thus, if the user is seeking assistance with running the program on Windows, it may be inferred that the user is using Windows 7. Accordingly, the response to the user input by the Dialog Management Program 116B (FIG. 1) may be based on the user's use of Windows 7.

At 214, a current node from among the one or more candidate nodes is selected. The selected current node may either be the single candidate node that is not a leaf node as determined at 208 or the candidate node having the lowest entropy value as determined at 212. In operation, the Dialog Management Program 116B (FIG. 1) may select a node as a current node in order to prompt the user for more information to select the most appropriate response. For example, if the Dialog Management Program 116B (FIG. 1) determines that the candidate node corresponding to Microsoft Windows had leaf nodes, for example was a branch node, then the Dialog Management Program 116B (FIG. 1) may designate that candidate node as the current node in order to further determine which version of Windows the user may have. In some cases, the Dialog Management Program 116B may transmit a prompt to the user to confirm the version of Windows they are using or to receive additional input from the user to further determine which version of Windows they are using. Additionally, if the Dialog Management Program 116B (FIG. 1) determines that the candidate node corresponding to Windows 7 had a lower entropy value than another candidate node corresponding to Windows XP, the Dialog Management Program 116B (FIG. 1) may designate the candidate node corresponding to Windows 7 as the current node and may transmit a prompt to the user to confirm the user is using Windows 7.

At 216, a prompt is transmitted to the user based on the selected current node. For example, the selected current node may be used to ask a question to the user in order to better determine the single leaf node that may be used to provide an answer or result to the user's initial inquiry. In operation, the Dialog Management Program 116B (FIG. 1) may transmit the output of the selected current node from the database 112 (FIG. 1) to the software program 108 (FIG. 1) via communication network 110 (FIG. 1). The transmitted prompt may be used to solicit information from the user that may allow the Dialog Management Program 116B (FIG. 1) to calculate new entropy value for the nodes, in order to determine if a single leaf candidate node extending from the current node is closely associated with or matches the user's input.

Figure 3:
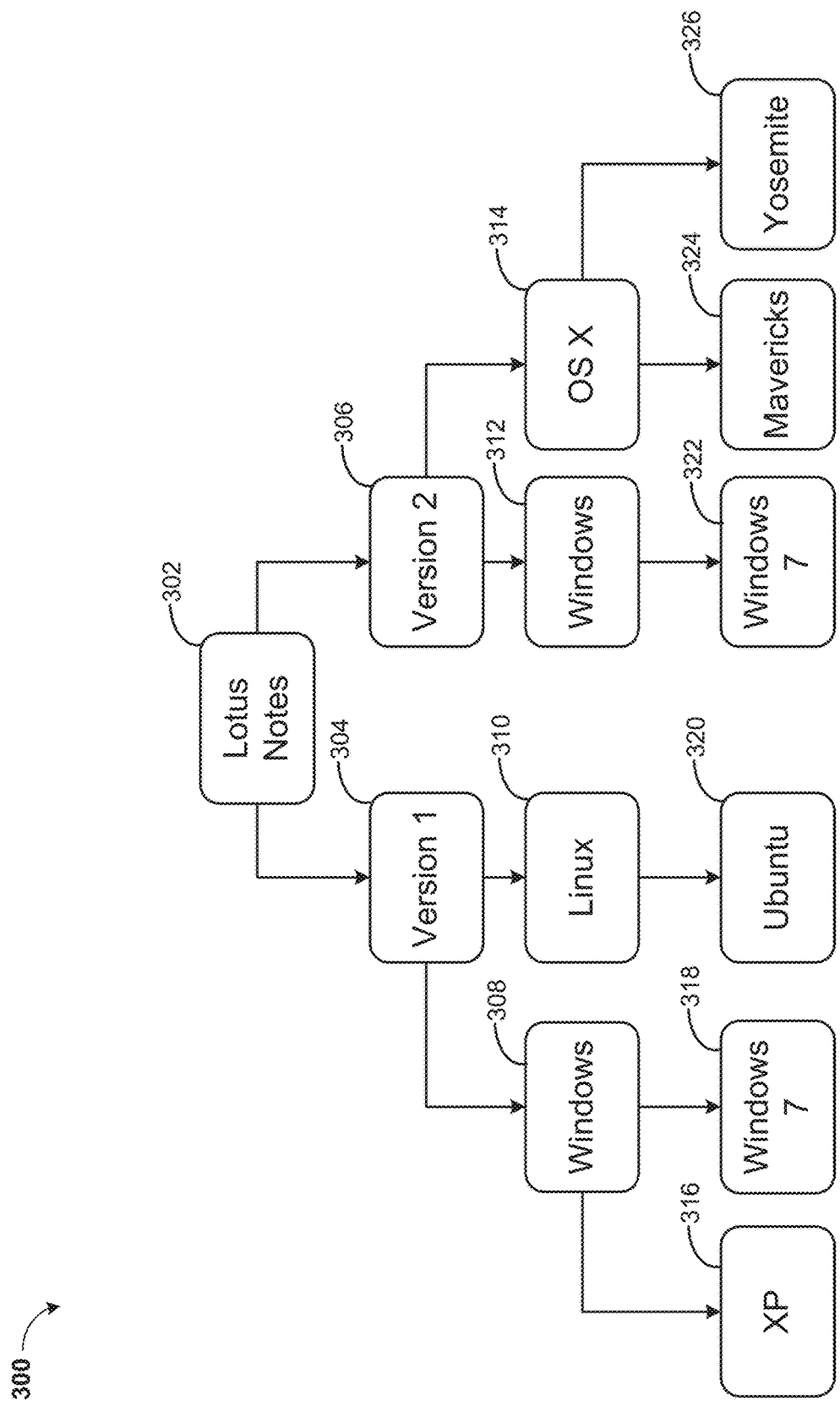
FIG. 3 is an exemplary view of a decision tree according to at least one embodiment.

Referring to FIG. 3, an exemplary view 300 of a decision tree in accordance with one embodiment are depicted. FIG. 3 may be described with the aid of the exemplary embodiment of FIG. 1. A decision tree may contain a plurality of nodes associated with a given field. In the case of an online computing help desk, for example, these nodes may correspond to, among other things, a computer program, an operating system, or a version number. Node 302 may correspond to Lotus Notes. Nodes 304 and 306 may correspond to Version 1 of Lotus Notes and Version 2 of Lotus Notes, respectively. Additionally, nodes 308 and 312 may correspond to Windows, node 310 may correspond to Linux, and node 314 may correspond to OS X.

Furthermore, nodes 316, 318, 320, 322, 324, and 326 may correspond to XP, Windows 7, Ubuntu, Windows 7, Mavericks, and Yosemite, respectively. It may be appreciated that Windows at node 308 is substantially the same or similar to Windows at node 312 and that Windows 7 at node 316 is substantially the same or similar to Windows 7 at node 322.

In operation, a user of the client computer 102 (FIG. 1) running XP may be having an issue with Lotus Notes. If the user inputs input into the Software Program 108 (FIG. 1) that he or she is having an issue with Lotus Notes, the Dialog Management Program 116B (FIG. 1) may identify that Lotus Notes is associated with node 302 of the decision tree and may subsequently prompt the user for the version number, operating system, and so on. However, if the user inputs into the Software Program 108 that he or she is having an issue with "Lotus Notes on XP", the Dialog Management Program 116B may identify "XP" as being associated with node 316. The Dialog Management Program 116B may the traverse the tree to identify the operating system as Windows and the version number of Lotus Notes to be Version 1 from nodes 308 and 304, respectively, and may provide an answer based on this information. Thus, only one input may be required by the user, which may, among other things, simplify the user's interactions with the decision tree dialog manger.

According to another embodiment, each node may have a pre-assigned probability value that may allow the Dialog Management System 116B to simplify user interactions with dialog tree decision managers by predicting information about the user. For example, ten percent of users of Lotus Notes on Windows 7 may be using Version 1 and ninety percent of users of Lotus Notes on Windows 7 may be using Version 2. A user may input into the Dialog Management Program 116B that they are having issues with Lotus Notes on Windows 7. Thus, the Dialog Management Program 116B may predict that the user is using Version 2 of the program based on the probability of Version 2 being greater than the probability of version 1 and may provide a solution corresponding to Version 2 of Lotus Notes.

In the field of healthcare, the nodes stored within the database 112 (FIG. 1) and utilized by Dialog Management Program 116B (FIG. 1) may correspond to concepts in medicine, such as organs and organ systems, diseases and illnesses, signs and symptoms, and treatments and medications. For example, the nodes stored within the database 112 (FIG. 1) may correspond to the circulatory system, organs of the circulatory system (e.g., heart, arteries, veins, etc.), diseases or illnesses of the circulatory system (e.g., myocardial infarction, cardiac arrest, etc.), and signs and symptoms of the circulatory diseases and illnesses (e.g., chest pain, apnea, diaphoresis). Thus, a user may input into the Software Program 108 that a patient is suffering from cardiac-related chest pain and Dialog Management Program 116B may determine that the cause is a myocardial infarction and provide an appropriate treatment.

Figure 4:
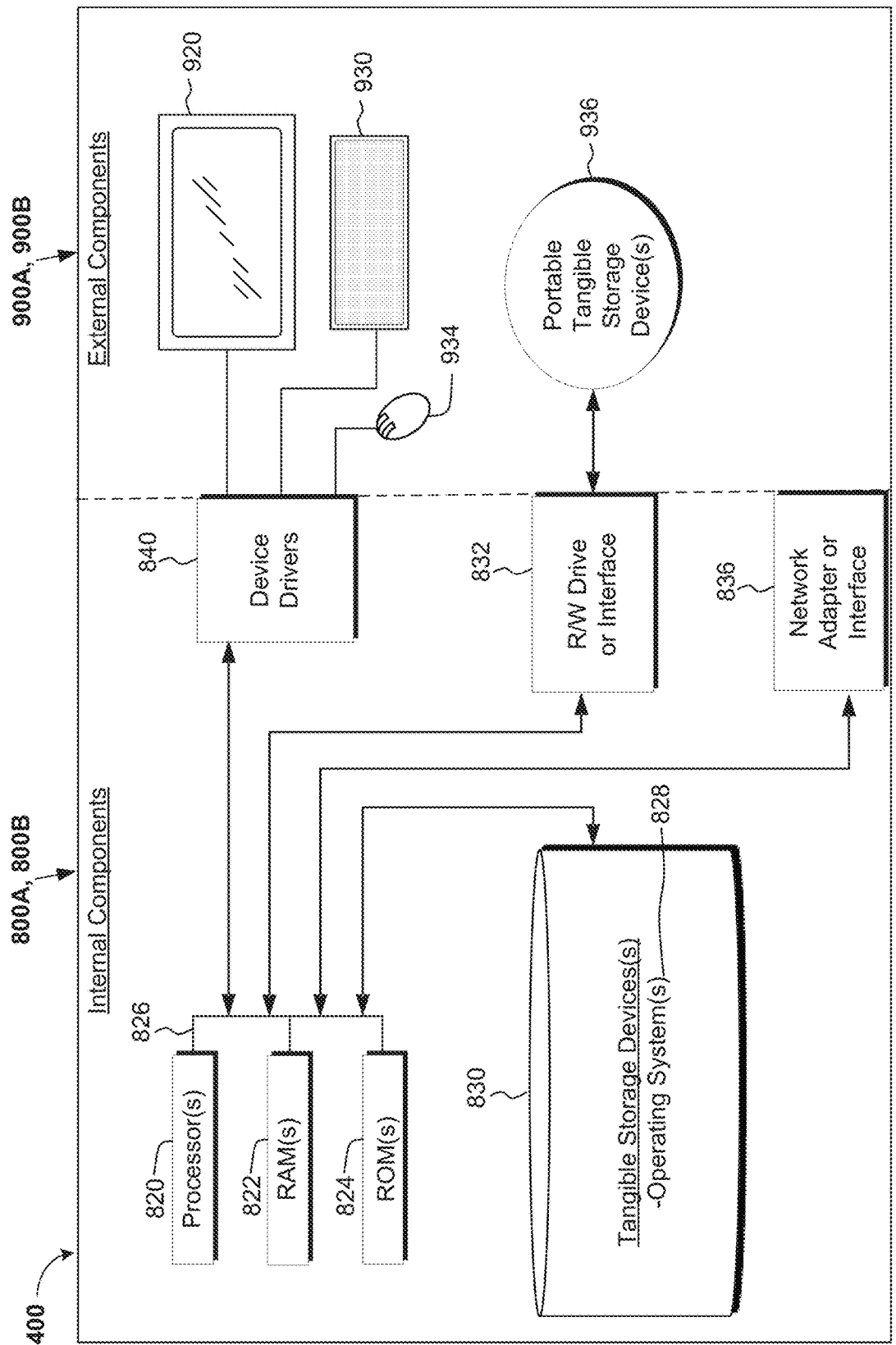
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computer 102 (FIG. 1) and the server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Dialog Management Program 116A (FIG. 1) in the client computer 102 (FIG. 1) and the Dialog Management Program 116B (FIG. 1) in the server computer 114 (FIG. 1) are stored on one or more of the respective computer-readable tangible storage devices 830 for execution by one or more of the respective processors 8/20 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Dialog Management Program 116A, 116B (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Dialog Management Program 116A (FIG. 1) in the client computer 102 (FIG. 1) and the Dialog Management Program 116B (FIG. 1) in the server computer 114 (FIG. 1) can be downloaded to the client computer 102 (FIG. 1) and the server computer 114 (FIG. 1) from an external computer via a network (for example, the Internet, a local area network or other, wide area network) and respective network adapters or interfaces 836. From the network adapters or interfaces 836, the Software Program 108 (FIG. 1) and the Dialog Management Program 116A (FIG. 1) in the client computer 102 (FIG. 1) and the Dialog Management Program 116B (FIG. 1) in the server computer 114 (FIG. 1) are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
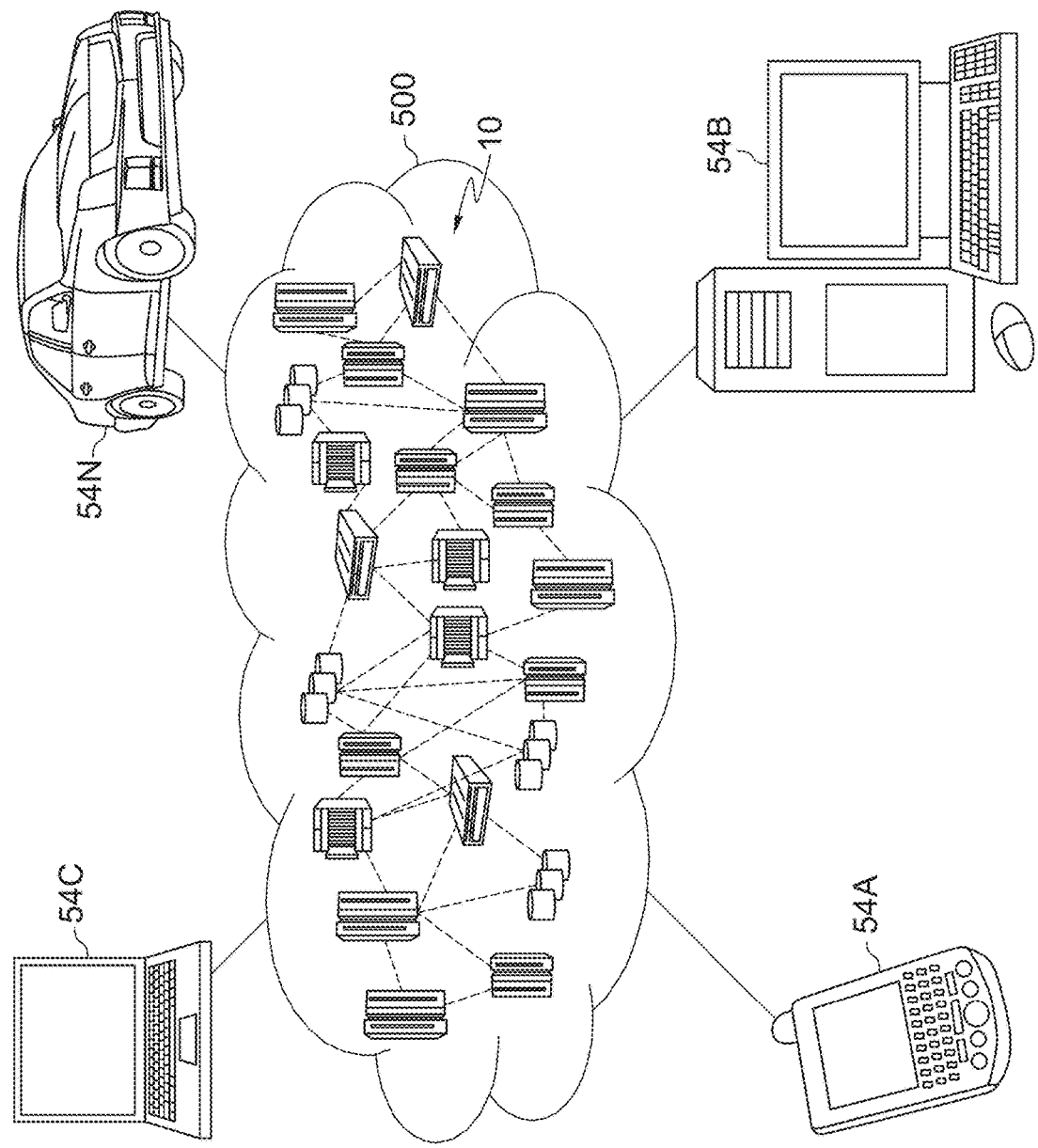
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 500 can communicate with any type of computerized device over any type of network and/or network addressable connection (e.g., using a web browser).

Figure 6:
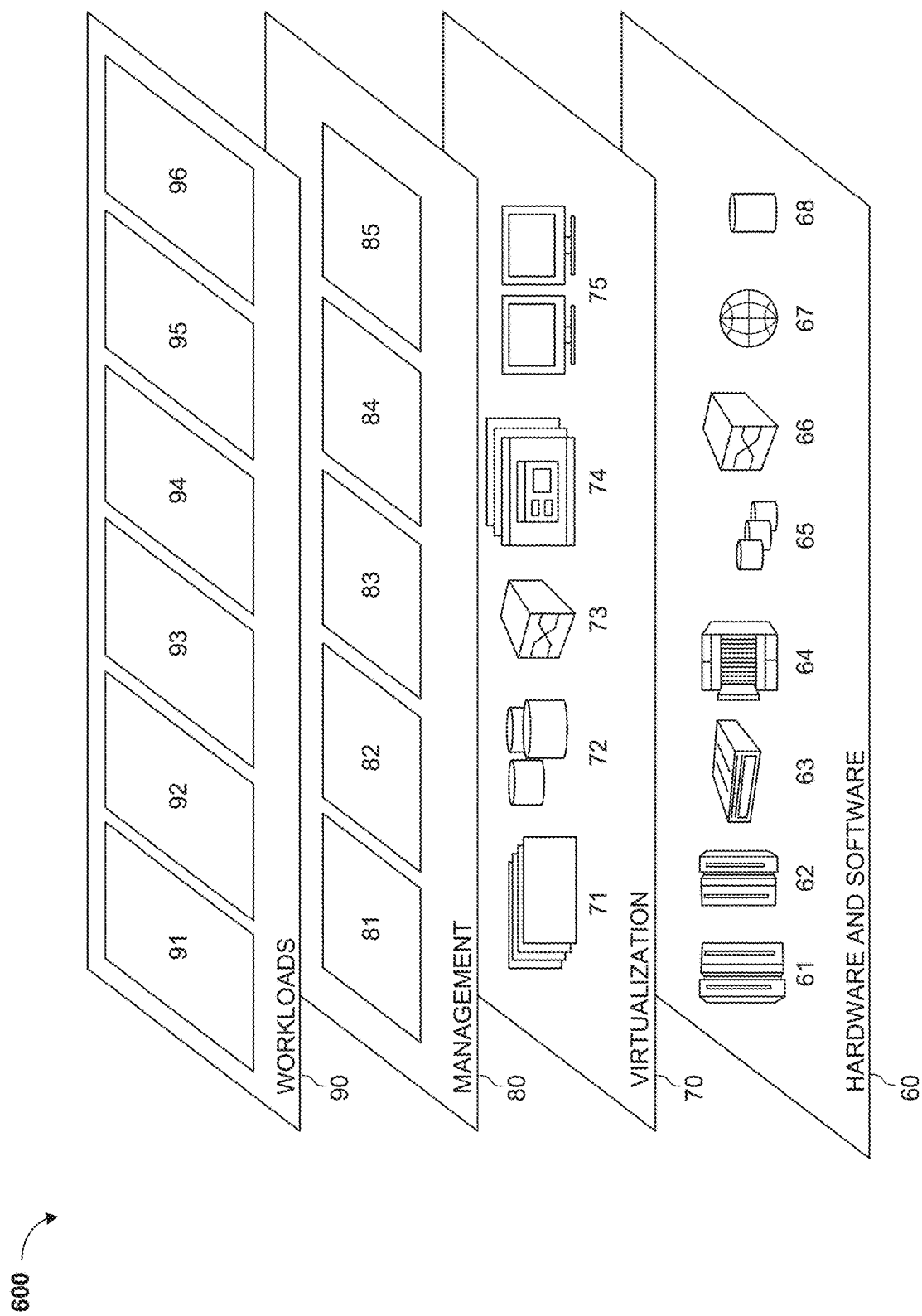
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Dialog Management 96. Dialog Management 96 may simplify user interactions with decision tree dialog managers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein. All trademarks used herein are the property of their respective owners.

What is claimed is:

1. A method for simplifying interactions by a user with a decision tree dialog manager, the method comprising:
    receiving, by a server computer, a user inquiry from a client computer over a network, wherein the received user inquiry is in a natural language format;
    identifying, by the server computer, one or more branch nodes of a decision tree, wherein the one or more identified branch nodes match the received user inquiry;
    calculating, by the server computer, an entropy value for each of the one or more identified branch nodes;

selecting, by the server computer, a current node from among the identified branch nodes, wherein the selected current node has a lowest calculated entropy value; and transmitting to the user over the network, by the server computer, a first prompt associated with the selected current node.

2. The method of claim 1, further comprising:

determining, by the server computer, based on the identification of only one branch node, whether the identified one branch node is a leaf node.

3. The method of claim 2, further comprising:

transmitting to the user over the network, by the server computer, an output associated with the one branch node, based on the determination that the one branch node is a leaf node.

4. The method of claim 2, further comprising:

transmitting to the user over the network, by the server computer, a second prompt associated with the one branch node, based on the determination that the single branch node is not a leaf node.

5. The method of claim 1, wherein selecting, by the server computer, the current node from among the one or more identified branch nodes comprises:

determining, by the server computer, a probability value associated with each of the one or more identified branch nodes; and selecting as the current node, by the server computer, a node from among the one or more identified branch nodes having a highest determined probability value.

6. The method of claim 1, wherein the network comprises a cloud computing environment.

7. The method of claim 1, wherein the one or more identified branch nodes comprise values corresponding to at least one of a software program, an operating system, a version number, a sign, a symptom, an illness, an organ, a diagnosis, and a treatment plan.

8. A method for simplifying interactions by a user with a decision tree dialog manager, the method comprising:

receiving a user inquiry;

comparing branch nodes of decision tree to the user's inquiry to identify a first branch node matching the user's inquiry;

receiving additional user input based on a value of the first branch node in response to selecting the first branch node; and identifying a second branch node matching the additional user input in response to receiving the additional user input, wherein the second branch node is neither a child node nor a parent node of the first branch node.

9. The method of claim 8, wherein two or more leaf nodes extend from the second branch node.

10. A method for simplifying interactions by a user with a decision tree dialog manager, the method comprising:

receiving a user inquiry;

comparing branch nodes of decision tree to the user's inquiry to identify a first branch node matching the user's inquiry;

receiving additional user input based on a value of the first node in response to selecting the first node;

identifying a second node matching the additional user input in response to receiving the additional user input, wherein the second node is a leaf node of the decision tree; and transmitting a value of the second node to the user.

* * * * *